Patented June 4, 1929.

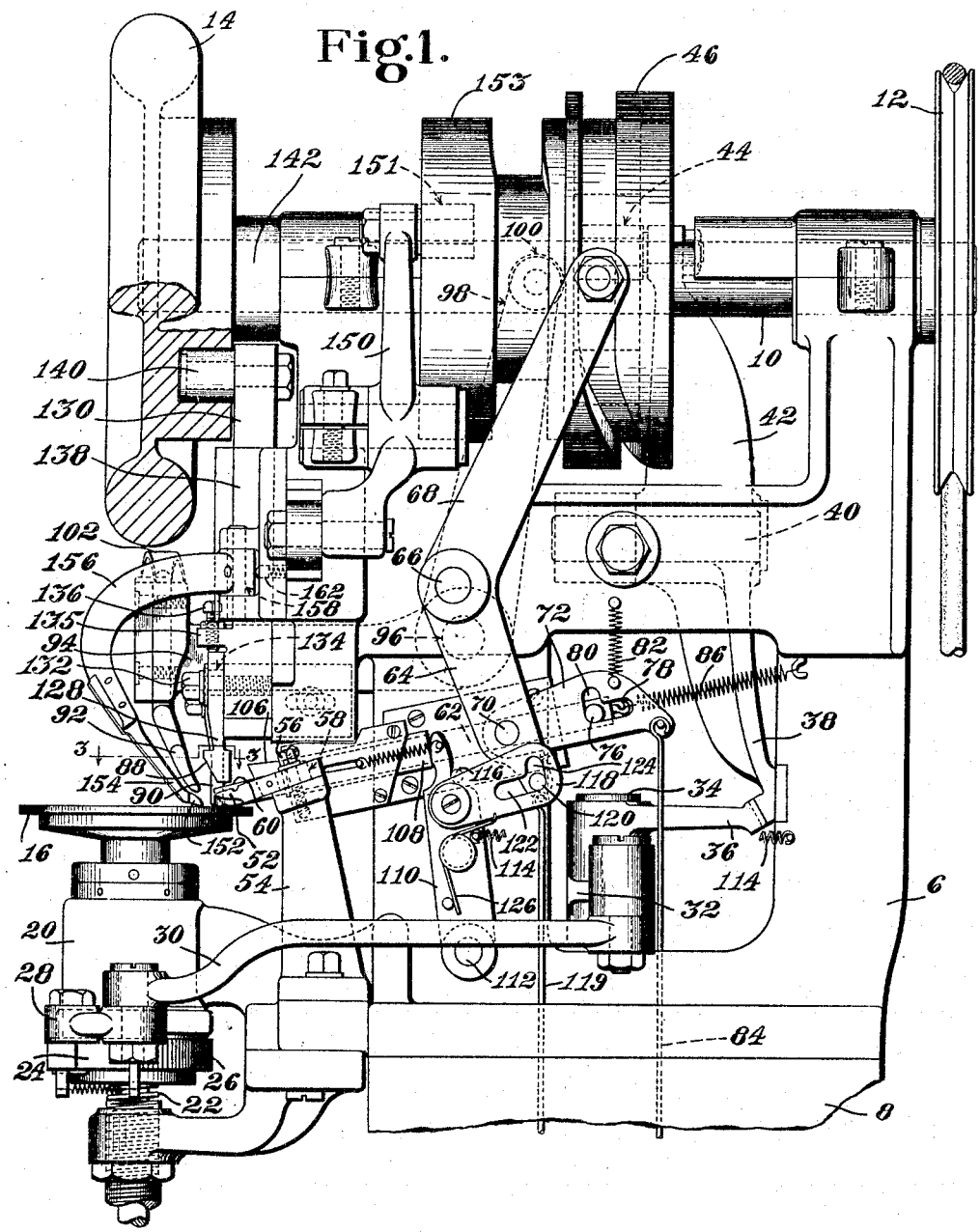

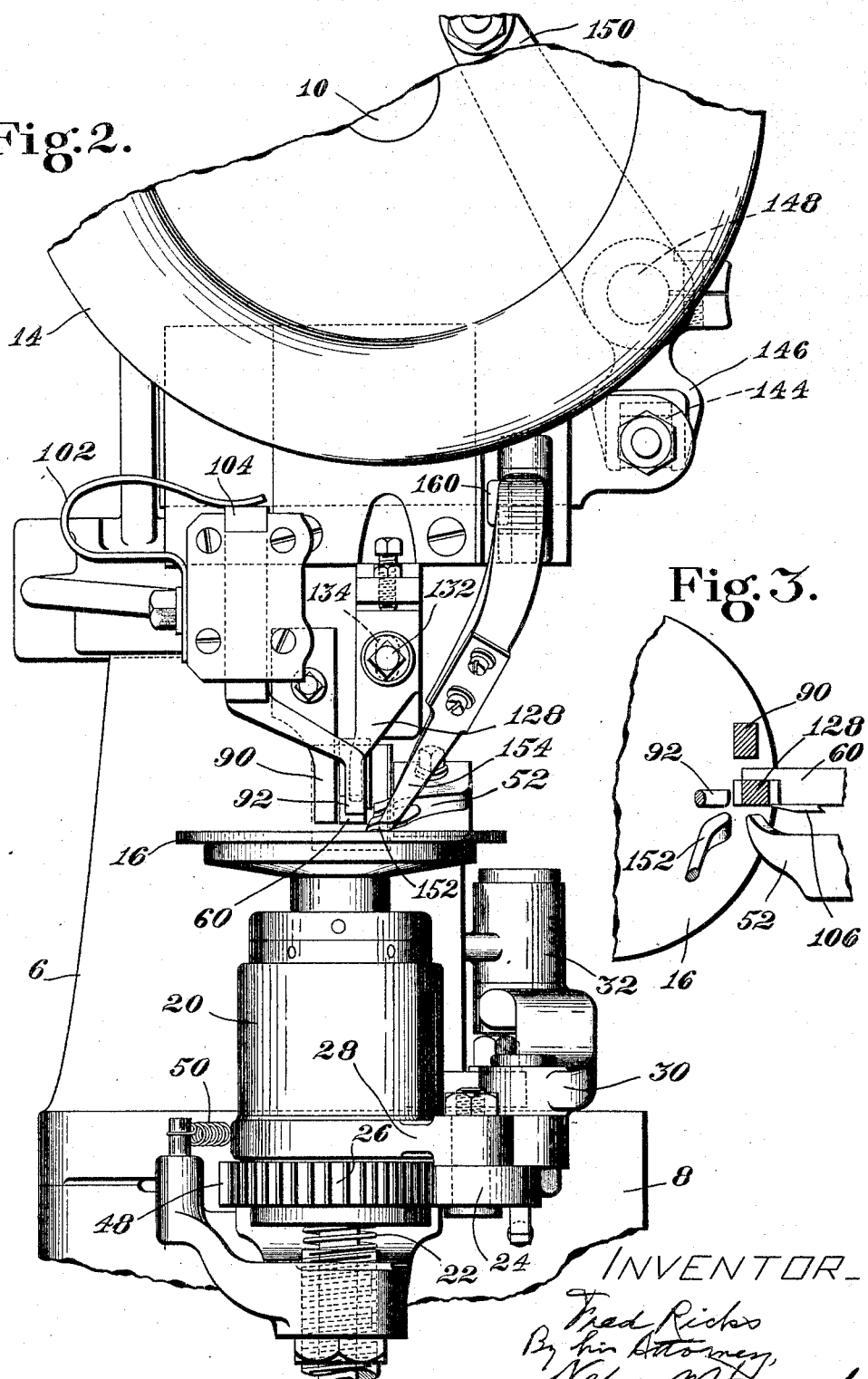

1,715,570

UNITED STATES PATENT OFFICE.

FRED RICKS, OF LEICESTER, ENGLAND, ASSIGNOR TO UNITED SHOE MACHINERY CORPORATION, OF PATERSON, NEW JERSEY, A CORPORATION OF NEW JERSEY.

LIP-TURNING MACHINE.

Application filed June 30, 1925, Serial No. 40,566, and in Great Britain July 21, 1924.

This invention relates to lip turning machines and is herein illustrated as embodied in a machine having lip turning mechanism of the type disclosed, for example, in United States Letters Patent No. 638,010, granted November 28, 1899, on application of J. B. Hadaway.

Machines having lip turning mechanism of the type above referred to have been in general use for turning and setting the lips of all-leather insoles and also the lips of insole blanks of the Gem or Economy type in which the blank is usually made of more or less flimsy and easily tearable material and the lip is reinforced by canvas. Whenever used for operating upon easily tearable stock such machines have a tendency to tear or otherwise injure the between substance. This is apparently due in a large measure to the peculiar nature of the feeding action of such machines which is effected continuously by the co-operation of two feed disks of substantial diameter which twist the work during the feeding movement toward the lip turning means in such a way that one of them tends to burrow into the between substance between the lip and the feather of the insole. Other contributory causes of damage to the between substance above referred to are apparently to be found in the fact that the lip setting hammer, in machines heretofore generally employed, is so shaped and actuated as to turn the lip over against the face of the sole or at least to turn it a considerable distance beyond a plane perpendicular to the face of the sole, and in the further fact that the hammer is generally arranged to engage the lip while the sole is being fed.

In view of the foregoing, one object of the present invention is to provide an improved lip turning machine in which there will be no liability that the between substance will be injured by the action of either the feeding means or the lip setting devices.

With this object in view, improved work feeding and lip setting means have been provided and arranged to co-operate in a novel manner. As herein illustrated the feeding means operates to advance the work step-by-step, a lip setting hammer is arranged to engage the outer side of the lip between successive feed movements of the work, and an inner lip setting member or anvil is provided for engaging the inner side of the lip to define the angle at the base of the lip and to support the lip against the blow of the hammer. The feeding means comprises a four-motion feed member engageable with the lipped face of the sole outside of the lip in such a way as to avoid engagement with and possible injury to the between substance.

With certain classes of stock a sufficient setting of the lip in a plane more or less nearly perpendicular to the face of the sole may be secured without the necessity of employing a reciprocating hammer and the consequent risk of weakening the between substance.

To avoid such risk of weakening the between substance another feature of the invention consists in the provision, in an insole lip turning machine having work supporting and feeding means and a lip setting hammer, of means for rendering the hammer inoperative during the operation of the feeding means.

In accordance with a still further feature of the invention the four-motion feed member which co-operates with the work supporting means to feed the work is constructed and arranged to exert also a turning action upon the lip. As shown, this feed member is also arranged to co-operate with the inner lip setting member or anvil to set the lip in upturned position.

A further feature of the invention consists in the combination with a lip setting hammer engageable with the outer face of the upturned lip of a sole and an anvil engageable with the inner face of the lip to co-operate with the hammer, of a lip slashing knife arranged to have shear co-operation with the anvil for the purpose of slashing the lip.

The above and other features of the invention will become more fully evident from the description which now follows of an illustrative machine embodying the invention.

In the accompanying drawings:—

Fig. 1 is a side elevational view of the head of the illustrative machine;

Fig. 2 is a front elevational view of a portion of the machine shown in Fig. 1; and Fig. 3 is a fragmentary view, partially in plan and partially in section on the line 3—3 of Fig. 1, showing the disposition of the various operating instrumentalities.

Referring to the drawings, the machine therein shown comprises the following operating parts:—an intermittently actuated rotary work supporting table 16; a four-motion upper feed member 128 co-operating with the table 16 to advance the work step-by-step; a plow or channel opening tool 52 for preliminarily raising the outer lip; a second channel opening tool or plow 152 which may be used for preliminarily raising the inner lip if a double lipped sole is to be operated upon; a hammer 60 for setting the lip or lips in upturned position; a lip support or anvil 92 which co-operates with the hammer 60 in the lip setting operation; a fixed lip retainer 90 which gives a final shaping action to the lip and assists in guiding the work; and a slitting or slashing knife 106 for operating upon the lip along the shank portions of the insole.

The parts above described are mounted upon a head 6 which is supported by a column or base 8. The head 6 is provided with bearings in which is rotatably mounted a cam shaft 10 extending from front to rear of the machine. The shaft 10 has fixed to its rear end a pulley 12 by which it is driven and to its front end a hand-wheel 14 by which it may be rotated by the operator. An insole to be operated upon is supported on a table 16 rotatably mounted in a bearing 20 projecting forwardly from the head 6. The table 16 is supported by a spring 22 and may be drawn down by a treadle (not shown) to allow an insole to be placed on the table beneath the tools. An adjustable stop of any suitable character may be provided to limit the upward movement of the table when no work is in the machine. The table 16 is rotated step-by-step to feed the insole by a feed pawl 24 which engages a ratchet wheel 26 splined to the work table spindle, the pawl being pivoted upon an arm 28 which is pivotally mounted concentrically with the axis of the table on the bearing 20. The arm 28 is connected by a rearwardly extending link 30 to one arm 32 of a horizontal bell-crank lever pivoted on a vertical stud 34 fixed in the head. The other arm 36 of the bell-crank lever extends rearwardly and has formed at its end a gear segment which meshes with a gear segment formed on the lower arm 38 of a vertical lever pivoted about midway of its length on a horizontal stud 40 fixed in the head. The upper arm 42 of the lever carries a cam roll 44 which enters a cam groove formed in the rear face of a cam 46 fixed on the cam shaft 10. The table 16 is prevented from rotation during the return movement of the feed pawl 24 by a second pawl 48 (Fig. 2) pivoted on the head and held in engagement with the ratchet wheel by a spring 50.

The plow 52 is arranged in advance of the hammer 60, in the line of feed, and is adapted to enter the outside channel so that it may function to open the channel by raising the channel lip into position to be acted upon by the hammer and also to assist in guiding the work. As shown, the plow 52 is fixed to a bracket 54 on the head 6 by a screw 56 passing through a slot 58 in the plow so that the plow may be adjusted forwardly or rearwardly.

The hammer 60 is arranged to bend and set the lip in upturned position more or less nearly at right angles to the plane of the insole after it has been turned up by the plow. To this end the hammer 60 is fixed by any suitable means such as a screw and slot connection (not shown but whereby it may be adjustable towards or from the front of the machine) to a bar 62 (Fig. 1) upwardly and rearwardly inclined and slidingly mounted in a guideway formed in the head 6 at an angle of approximately 12° to the horizontal. The hammer bar 62 is reciprocated by a cam lever 64 pivoted on a stud 66, the upper arm 68 of the cam lever carrying a cam roll which engages a peripheral cam groove formed in the cam 46 aforementioned. The lower arm of the cam lever has fixed in it a horizontal pin 70 on which is pivoted a latch arm 72 having formed in it a right-angled slot which receives a pin 76 projecting from the hammer bar 62. One portion 78 of the slot 74 is substantially parallel to the hammer bar and its guideway while the other portion 80 extends upwardly therefrom so that when the latch 72 is raised about its pivot 70 the pin 76 is engaged by the portion 78 of the slot and so no movement is imparted to the hammer when the cam shaft is rotated. When the latch 72 is swung downwardly the pin 76 is engaged by the portion 80 and the hammer is operated by the cam lever 64. The latch 72 is held normally in its raised position by a spring 82 which is connected to the latch and to the head 6 and the latch is swung down about its pivot 70 to put the hammer into action by a lever (not shown) which is connected with the latch by a rod 84 and is adapted to be held in any position to which it is moved. When the hammer is out of operation it is held in retracted position by a spring 86 attached to the hammer bar and to the head 6, this position being determined by engagement of a portion of the front end of the bar with a face on the head.

When operating upon thick or tough insoles the hammer 60 is thrown into operation and engages the channel lip after it has been turned up by the plow 52 and bends and sets the lip as aforesaid. With very thin or flimsy insoles it is found that this action of the hammer may tend to tear the material at the base of the lip and in such an event the hammer need not be used, the lip being merely turned up by the action of the plow 52 with or without the assistance of a wedge or cam face 88 hereinafter described.

When the hammer 60 engages the lip the latter is supported at its base, at a point substantially opposite the hammer, by means of a lip support or anvil 92 carried by one arm 94 of a cam lever, the latter being pivoted on a horizontal stud 96 which extends across the machine and is fixed in the head. The other arm 98 of the cam lever carries a cam roll 100 which enters a peripheral cam groove formed in the cam 46 on the cam shaft. The cam lever is rocked to move the lip support or anvil 92 downwardly through a path substantially normal to the plane of the sole and to the path of the hammer 60 into engagement with the inside of the lip at its base just before the hammer engages the lip. The arrangement is such that the lip support strikes the insole between the lip and the body of the insole and sharply bends the material there to define an angle and thus, by a sort of creasing action, to assist the other tools in positioning the lip so that the latter retains the position to which it is turned by those tools. To this end the lip support or anvil 92 is mounted in the forward end of the arm 94, so that it can slide vertically in the arm, and the support is urged downwardly by a spring 102 fixed on the arm 94 and arranged to engage the upper end of the lip support. When the arm is raised, downward movement of the lip support under action of the spring 102 is limited by a projection 104 (Fig. 2) on the lip support which engages a face on the arm 94. The lip support is thus yieldingly pressed against the insole so as automatically to compensate for different thicknesses of material.

The lip retainer 90 is fixed to the head of the machine and is situated just behind the hammer 60 (considered along the line of feed). The retainer 90 engages the feather of the insole in the angle formed by the upstanding lip, the front face of the retainer engaging the outer face of the lip to assist in guiding the work by holding the lip in proper transverse relation to the other operating tools. The lower face of the lip retainer 90 engages the upper face of the feather and functions to position the work in the plane of the lip setting tools. Between successive feed movements the work is clamped between the lip retainer and the work table.

When turning up the lip along the concave curves of the insole at the shank it is desirable to slash or slit the lip at different positions to enable the lip the more easily to be bent up and to retain its position when the insole is bent in attaching it to the last and for this purpose the slashing or slitting knife 106 is provided. The slashing knife 106 is movable to cut the upturned lip in a direction substantially normal to the plane of the lip. To this end the knife 106 is fixed on the forward end of a slide 108 which is mounted in the head to slide parallel to the hammer bar guideway and may be connected to the cam lever 64 (which operates the hammer) when it is desired to slit the lip. The connections between the knife slide and hammer cam lever 64 comprise an arm 110, pivoted to the head upon a horizontal stud 112, which arm at its upper end engages the rear end of the knife slide 108. The arm 110 is, when the knife is out of operation, held rearwardly by a spring 114 connected to it and to the head, against a stop pin 116 fixed in the head, the knife slide being also held rearwardly against the arm 110 by a spring connected to the slide and the arm. Pivoted on the arm 110 is a latch arm 118 having formed in it a right-angled slot which receives a pin 120 fixed in the hammer cam lever 64. The slot has one portion 122 substantially parallel to the knife slide and to the path of movement of the pin 120 and an upwardly extending portion 124 at right angles thereto. The latch arm 118 is normally urged upwardly by a spring 126, the lower portion 122 being normally maintained in engagement with the pin 120 so that during movement of the cam lever no movement is imparted to the knife. When it is desired to throw the knife into operation the latch arm 118 is swung downwardly about its pivot by a treadle (not shown), to which it may be connected by a rod 119, so as to move the upwardly extending portion 124 of the slot into engagement with the pin 120.

It will be understood that when the lip setting hammer and the slashing knife are both in operation they are both reciprocated by the cam lever 64 at the same time in parallel paths towards and from the work, the slitting knife passing (see Fig. 3) through the lip at one side of the lip support or anvil 92 which, as already described, supports the lip during the blow of the hammer and therefore also supports the lip during the slitting action of the knife, with which it is arranged to have shear co-operation.

The upper feed member 128 co-operates with the work supporting table 16 in feeding the work and this upper feed member is arranged to engage the margin or feather of the insole just outside the upturned lip, and between the plow 52 and the lip retainer 90, in the location in which the hammer operates and therefore at a time when the hammer is in a retracted position. Thus the hammer and the upper feed member are adapted successively to occupy the same location in the machine in their operation upon the work. By reason of this construction the various tools can be arranged in very small compass whereby operation upon curved portions of the work such as the toe portion (especially of narrow or pointed toe work) is facilitated. This construction and arrangement also minimize strain on the between substance in the course of feeding the work, inasmuch as there is no co-operative engagement of the lip setting devices with the lips during the feed movements of the work.

Th feed member 128 is clamped to a vertical bar 130 by a screw 132 passing through a vertical slot 134 in the feed member. The bar 130 has formed on it a forwardly projecting lug 135 through which is threaded a screw 136 which engages the upper face of the feed member 128 so that the member is supported against vertical movement relatively to the bar and may be adjusted on the bar when the clamp screw 132 is slackened. The bar 130 is mounted to slide vertically in a member 138 movable horizontally in the direction of feed and has at its upper end a cam roll 140 which enters a cam groove formed in a cam 142 fixed on the cam shaft so that during the rotation of the cam shaft the feed member is raised from and lowered on to the insole. The horizontally movable member 138 is slidingly mounted on the head and has pivotally mounted on its right-hand end (Fig. 2) a rectangular block 144 which is engaged by a forked arm 146 of a lever pivoted on a rearwardly extending stud 148 which is fixed to the head above the block. A second arm 150 of the lever extends upward and has at its upper end a cam roll 151 which enters a cam groove formed in a cam 153 on the cam shaft. By this means the feed member 128 is moved laterally of the machine to feed the insole. As the feed member is moved down into engagement with the insole it slightly depresses the table 16 so as to move the insole down slightly below the plow 52 and lip retainer 90, which co-operate with the table in holding the insole in the intervals between feed strokes, the feed member and table then moving in company to feed the insole.

In operating upon flimsy insoles it is, as already indicated, frequently undesirable to use the hammer but at the same time it is often desirable to turn somewhat further the lip which has already been preliminarily raised by the plow 52. In the present construction this can be accomplished by the wedge face 88, hereinbefore referred to, this wedge face, as shown in Fig. 1, being formed on the upper feed member 128 and so arranged that when the member 128 comes down towards the work the wedge contacts at first with the upper edge of the lip. As the wedge descends further it bends the lip backwardly or cams it aside by reason of its tapered shape and so acts to some extent as a setting tool. It is found that on some work such a setting action is sufficient. When acting in conjunction with the hammer the latter may be regarded as a primary lip setting tool and the member having the wedge face 88 as a secondary lip setting tool.

The channel opening tool or plow 152 is for opening the channel which is formed inside the lip in some insoles and to that end it is pivotally mounted upon the lower end of a bar 154 connected to the head. As shown, the bar 154 is engaged by a leaf spring so arranged that the tool 152 may, by yielding forwardly of the machine or away from the base of the lip, accommodate itself to variations, either in the same insole or in different insoles, in the distance between the bottom of this inside channel from the outside of the base of the lip which is engaged by the plow 52 and the lip retainer 90. In other words this yielding characteristic of the plow 152 enables the plow to adapt itself to variations in the width of the "between substance" of the sole. The channel opening tool is arranged to be moved bodily out of operative position when desired and for this purpose the bar 154 on which the tool is formed is fixed to an arm 156 which is pivoted on a vertical pivot 158 fixed in the head so that the tool may be swung from its operative position in front of the machine in a direction substantially parallel to the plane of the sole to an inoperative position at the side of the machine. A lug 160 (Fig. 2) on the arm, by its engagement with the head, positions the tool in operative position and a spring plunger 162 (Fig. 1) in the head by its engagement with a recess in the hub of the arm holds it in inoperative position. It will be noted that when the tool is in inoperative position neither the pull of gravity nor the vibration of the machine in action will have any tendency to return the tool to operative position.

The operation of the machine is as follows:—

The table 16 being depressed, the insole is inserted and the table released to clamp the feather of the insole against the lower face of the lip retainer 90. The machine having been started and the plow 52 being entered under the lip, the upper feed member 128 moves down against a portion of the feather exposed by the lifting of the lip to press the insole against the table 16 and, continuing its descent, depresses the table slightly so that the feather clears the lip retainer 90 and the friction of the plow 52 on the feather is relieved. The feed member 128 and table 16 then move to feed the insole past the lip retainer 90 and the plow 52 which act as work guides or gages, the rotary movement of the table tending to swing the work against the plow so that the latter shall follow the curved contours of the work. This tendency is adequate but not excessive owing to its being created merely by the rotational movement of one of the co-operating feed members and merely by frictional grip of a large flat surface of that member while the other member (the rectilinearly moving member 128) has so restricted an area of contact with the feather as to allow easy turning of the work upon it.

Having described my invention, what I claim as new and desire to secure by Letters Patent of the United States is:

1. In a machine of the class described, means for upturning the lips of a double lipped sole, intermittently operating co-acting devices for setting the lips in upturned position, and means including a rotary work support for feeding the sole step-by-step past the lip setting devices, the sole feeding means and the lip setting devices being constructed and arranged to perform their respective functions alternately.

2. In a machine of the class described, a plow for upturning the lip of a sole, intermittently operated co-acting members for setting the lip in upturned position, means including a yielding work support effective only during the intervals between the lip setting operations for feeding the sole past the lip setting means, and a fixed member against which the work is clamped by the work support while the lip setting members are operating.

3. In a machine of the class described, a plow for raising the lip of a sole and guiding the sole by engagement with the lip, a member spaced from the plow in the direction of work feed for co-operating with the plow in guiding the work, means arranged to operate upon the lip between portions engaged by the plow and said member to set the lip in raised position, and means for feeding the work past the plow and the lip setting means.

4. In a machine of the class described, a fixed plow for raising one lip of a double lipped sole, and a second plow mounted for yielding movement away from the fixed plow for raising the other lip.

5. In a machine of the class described, inner and outer plows for raising respectively the inner and outer lips of a double lipped sole, said plows being mounted for relative yielding movement in accordance with variations in the width of the between substance.

6. In a machine of the class described, means for feeding a channeled sole by engagement with opposite sides of the feather, means operating in advance of the feeding means for turning up the channel flap to form a lip and expose the feather to the action of the feeding means, a lip setting member constructed and arranged to engage one side of the lip of the sole, and a second lip setting member constructed and arranged to engage the other side of the lip for co-operating with the first member to set the lip, and means for moving the second lip setting member into and out of co-operative relation with the first member in a path substantially normal to the plane of the sole.

7. In a machine of the class described, means for feeding a channeled sole by engagement with opposite sides of the feather, a plow located in front of the feeding means and adapted to open the channel to form a lip, a lip setting member constructed and arranged to engage one side of the lip of the sole, and a second lip setting member constructed and arranged to engage the other face of the lip for co-operating with the first member to set the lip, and means for moving said members in directions substantially at right angles to each other, to move the members into co-operative lip setting relation.

8. In a machine of the class described, means for feeding a sole step-by-step, a lip setting hammer for engaging the outer side of the lip of the sole between successive feed movements of the sole, and an anvil moving in timed relation with the hammer for engaging the inner side of the lip to define an angle at the base of the lip and to support the lip against the blow of the hammer.

9. In a machine of the class described, means for feeding a sole intermittently, a lip setting member movable between successive feed movements of the sole into position to engage the outer side of the lip, and a second lip setting member constructed and arranged to engage the inner face of the lip for co-operating with the first member to set the lip, means for moving the inner member into engagement with the base of the lip to define an angle between the lip and the body of the insole, and means for thereafter moving the outer member into co-operative relation with the inner member to set the lip.

10. In a machine of the class described, the combination with a lip turning member, of a lip setting hammer and a reciprocating feed member movable successively into the same location in the machine in their operations upon the work.

11. In a machine of the class described, a movable support for a channeled sole, a plow for raising the channel flap to form a lip, a lip retainer for engaging the outer face of the lip, a four-motion feed member for engaging the margin of the sole between the plow and the lip retainer and cooperating with said support to feed the sole, and a hammer operatively engaging the lip of the sole in alternation with the work engaging strokes of the feed member for setting the lip in upturned position.

12. In a machine of the class described, a sole support, a hammer for engaging the outer side of a lip of a sole on the support to set the lip in upturned position, an anvil for engaging the inner side of the lip to co-operate with the hammer, and a lip slashing knife arranged to have shear cooperation with the anvil.

13. In a machine of the class described, a lip setting device, a lip slashing device, means for feeding a sole step-by-step past the lip setting and the lip slashing devices, a common actuator for said devices, normally inoperative connections between said actuator and each of said devices, and operator controlled means for rendering either of said connections operative.

14. In a machine of the class described, means for feeding a lipped sole step-by-step, means for preliminarily upturning the lip of the sole, and lip setting means comprising a hammer movable in a direction substantially perpendicular to a plane of the upturned lip for engaging one face thereof and an anvil movable in a direction substantially perpendicular to the direction of movement of the hammer for engaging the opposite side of the lip to co-operate with the hammer.

15. In a machine of the class described, means for supporting and feeding a double lipped sole, means for preliminarily raising the outer lip of the sole, and a plow for preliminarily raising the inner lip of the sole, the plow being mounted to yield to accommodate itself to variations in the width of the between substance of the sole.

16. In a machine of the class described, means for supporting and feeding a lipped sole, a hammer for setting the lip in upturned position, and means for rendering the hammer inoperative during the operation of the feeding means.

17. In a machine of the class described, a primary lip setting member and a secondary lip setting member arranged to engage the same side of the lip of a sole, mechanism for operating said members, and means for throwing the primary lip setting member out of action during the operation of the secondary lip setting member.

18. In a machine of the class described, a plow for turning the lip of a sole part way toward a desired transverse angular relation with the body of the sole, cooperating members for feeding the sole, one of said members operating also to complete the turning of the lip, and means for setting the lip after it has been turned.

19. In a machine of the class described, the combination with means for preliminarily raising the lip of a sole, of means including a feed member having a movement toward and from the work and back and forth in the plane of the work, and means on said member effective during movement of the member toward the work to set the lip in raised position.

20. In a machine of the class described, means for supporting and feeding a double lipped sole, means for preliminarily raising the outer lip, and a plow pivotally mounted for swinging movements into and out of operative position for preliminarily raising the inner lip.

21. In a machine of the class described, means for supporting and feeding a double lipped sole, means for preliminarily raising the outer lip, and a plow for preliminarily raising the inner lip, said plow being mounted to swing into and out of operative position about a pivotal axis substantially perpendicular to the plane of the sole.

22. In a machine of the class described, means for supporting and feeding a double lipped sole, means for preliminarily raising the outer lip, a plow for preliminarily raising the inner lip, said plow being mounted for movements in directions parallel to the plane of the sole into and out of operative position, and means for determining the operative position of the plow.

23. In a machine of the class described, means for supporting and feeding a double lipped sole, means for primarily raising the outer lip, a plow for preliminarily raising the inner lip, said plow being pivotally mounted for swinging movements into and out of operative position, and means for latching the plow in inoperative position.

24. In a machine of the class described, a rotary work supporting table, a four-motion feed member for cooperating with the table to feed a lipped sole, and means for setting the lip in upturned position comprising an anvil for engaging one side of the lip and a cam face on said feed member for engaging the other side of the lip.

25. In a machine of the class described, a work support, a four-motion feed member for co-operating with said support to feed a sole, and means on said feed member for turning the lip of the sole.

26. In a machine of the class described, a work support, a four-motion feed member for co-operating with said support to feed a sole, a plow for raising the lip of the sole, and means on said feed member for turning the lip after it has been raised by the plow.

In testimony whereof I have signed my name to this specification.

FRED RICKS.